US005640495A

United States Patent [19]
Colbert et al.

[11] Patent Number: 5,640,495
[45] Date of Patent: Jun. 17, 1997

[54] COMPUTER-PRINTER INTERFACE CONTROL FOR BIDIRECTIONAL/ UNDIRECTIONAL DATA COMMUNICATIONS

[75] Inventors: Carl Lee Colbert, Louisville; John Neil Wellman, Lexington, both of Ky.

[73] Assignee: Lexmark International, Inc., Lexington, Ky.

[21] Appl. No.: 359,479

[22] Filed: Dec. 20, 1994

[51] Int. Cl.[6] .................................................. G06F 15/00
[52] U.S. Cl. ............................. 395/112; 395/200.01
[58] Field of Search ................................. 395/100, 101, 395/112, 153, 157, 275, 800, 114, 575, 182.16, 183.79, 200.01; 370/112

[56] References Cited

U.S. PATENT DOCUMENTS

| 5,075,875 | 12/1991 | Love et al. ............................. 395/117 |
| 5,079,764 | 1/1992 | Orita et al. ............................. 370/85.13 |
| 5,084,875 | 1/1992 | Weinberger et al. .................. 371/29.1 |
| 5,164,842 | 11/1992 | Gauronski et al. ..................... 358/401 |
| 5,214,772 | 5/1993 | Weinberger et al. .................. 395/575 |
| 5,220,566 | 6/1993 | Ikenoue ................................. 370/112 |
| 5,220,674 | 6/1993 | Morgan et al. ......................... 395/800 |
| 5,226,112 | 7/1993 | Mensing et al. ........................ 395/114 |
| 5,247,623 | 9/1993 | Sun ........................................ 395/325 |
| 5,271,065 | 12/1993 | Rourke et al. .......................... 382/1 |
| 5,303,336 | 4/1994 | Kageyama et al. ..................... 395/114 |
| 5,323,393 | 6/1994 | Barrett et al. ........................... 370/85.8 |
| 5,333,286 | 7/1994 | Weinberger et al. .................. 395/575 |
| 5,337,258 | 8/1994 | Dennis .................................. 364/551.01 |
| 5,353,388 | 10/1994 | Motoyama ............................. 395/117 |
| 5,361,265 | 11/1994 | Weinberger et al. .................. 371/29.1 |
| 5,371,837 | 12/1994 | Kimber et al. .......................... 395/114 |
| 5,371,850 | 12/1994 | Belsah et al. ........................... 395/200 |
| 5,379,382 | 1/1995 | Woru et al. ............................. 395/275 |
| 5,438,528 | 8/1995 | Emerson et al. ....................... 364/580 |

FOREIGN PATENT DOCUMENTS

0575168A1  12/1993  European Pat. Off. ............ G06F 3/12

OTHER PUBLICATIONS

Mastering Windows 3.1 / Robert Cowart, 1993 Edition pp. 60–67 and 453–455.
HP JetDirect Network Interface Configuration Guide, Hewlett–Packard Manual Part No. J2371–90001, 1993, pp. iv–ix and Section 2 Software Installation and Configuration for Novell Netware Networks, pp. 2—2 through 2–18.
HP JetDirect EX External Network Interface Configuration Guide, Hewlett–Packard Manual Part No. J2382–90101, 1993, pp. 7–12 and Section 2 Novell Netware Networks, pp. 2—2 through 2–36.
Lexmark WinWriter 600 User's Reference, Manual No. SA–0779–00, 1993, Chapter 2 Using the Windows Printing System, pp. 11–26 and Chapter 3 Checking Print Status, pp. 27–39.
Standard Signaling Method for a Bi–directional Parallel Peripheral Interface for Personal Computers, IEEE P 1284 D2.00, Sep. 10, 1993, Institute of Electrical and Electronic Engineers, pp. 1–119.
Network Printing Alliance Protocol, A Printer/Host Control Specification, Level 1, Revision N, Feb. 11, 1994, Developed By The Network Printing Alliance.

*Primary Examiner*—Arthur G. Evans
*Assistant Examiner*—Gabriel I. Garcia
*Attorney, Agent, or Firm*—John J. McArdle, Jr.; William J. Dick

[57] ABSTRACT

A computer and printer system in which communication between the computer and printer can be carried out in either a bidirectional mode or a unidirectional mode. As disclosed, the computer operates in a single-threaded multi-tasking environment in which a printer control utility application runs to facilitate bidirectional communication with an attached printer. The application program maintains the computer parallel port in a bidirectional communication and printing mode, but is capable of taking the parallel port out of this mode in order to perform unidirectional printing, either from another application operating in the multi-tasking environment or from a DOS session running in the environment. The printer control utility prevents the mixing of unidirectional and bidirectional print jobs through the parallel port.

4 Claims, 5 Drawing Sheets

COMPUTER-PRINTER INTERFACE CONTROL FOR BIDIRECTIONAL/ UNIDIRECTIONAL DATA COMMUNICATIONS

BACKGROUND OF THE INVENTION (1) Field of the Invention:

This invention relates generally to a computer and printer system in which communication with the printer from the computer can occur in different modes. The invention more particularly concerns maintaining in the computer the capability of unidirectional communication of print jobs to the printer and the capability of bidirectional communication with the printer, while resolving conflicts between the two modes of communication in an acceptable manner.

(2) Background of the Invention:

The invention is disclosed particularly in relation to a personal computer operating under the Microsoft Windows 3.1 environment and running a Windows application program which is capable of bidirectional communication with a printer attached to the computer's parallel port.

In the particular system to be described, the application program for printing and bidirectional communication running under Windows maintains the parallel port of the personal computer in a bidirectional communication and printing mode, but the parallel port must be taken out of this mode in order to perform unidirectional printing, either from another Windows application or from a DOS session running under Windows. Care must also be taken to prevent the mixing of unidirectional and bidirectional print jobs through the parallel port. Both the prevention of starting unidirectional printing while a bidirectional printing job is underway and the prevention of bidirectional printing when unidirectional printing is underway must be accomplished.

(3) Summary of the Invention:

It's the general aim of the invention to provide multi-mode printing without errors in systems of the foregoing type.

In the embodiment of the invention to be described herein, the multi-mode printing technique permits bidirectional and unidirectional printing and printer communication without errors from mixing print modes. The technique takes the form of having the above-mentioned Windows printing application hook calls from the Windows Print Manager to the Windows VPD to detect unidirectional Windows printing. For DOS session print jobs, the printing application hooks I/O and BIOS interrupt 17h access to the parallel port.

The printing application running under Windows also determines if a bidirectional print job is being communicated to the printer over the parallel port in order to determine whether or not to permit unidirectional printing at any given time.

DETAILED DESCRIPTION

Figure 1:
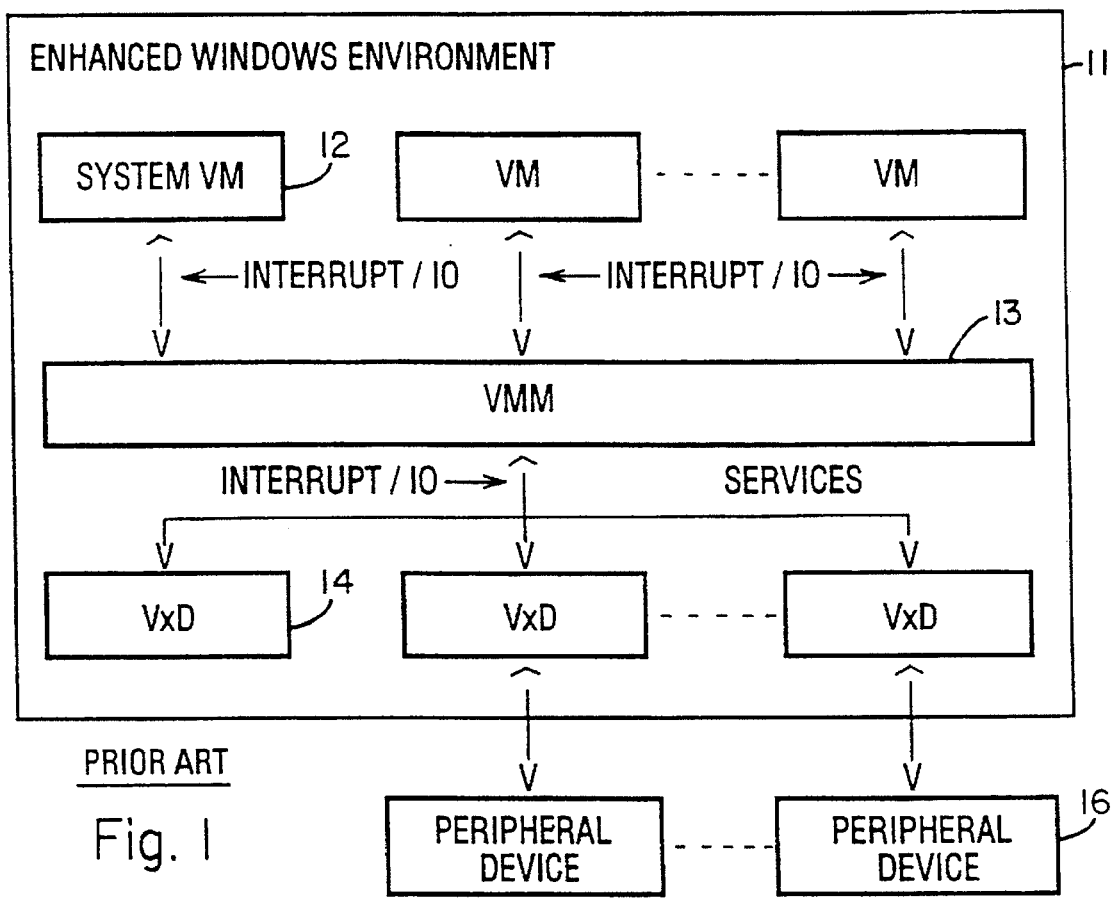
FIG. 1 is a block diagram of the Windows 3.1 enhanced mode environment.

Printing under the Microsoft Windows 3.1 enhanced mode single-threaded multitasking environment presents problems that are not present in a single-tasking operating system. Further references herein to Windows are to the Microsoft Windows 3.1 operating environment. FIG. 1 is a block diagram of the Windows enhanced mode environment 11.

The System virtual machine (VM) 12 is the virtual machine that the Windows graphical user interface runs in. DOS applications run in VM's of their own. There is only one System VM, but there can be more than one VM, i.e., DOS session, in the Windows enhanced mode environment. In addition, more than one Windows application can be opened in the System VM 12 at a time.

The Virtual Machine Manager (VMM) 13 provides Windows enhanced mode with the multitasking operating environment function. It controls main memory, CPU execution time, and peripheral devices. The VMM also provides services to VxD's. For the purpose of simplicity, the VMM will be omitted from further figures in this application.

Virtual Device Drivers (VxD's) such as 14 provide access to peripheral devices such as 16. Examples of peripheral devices are the keyboard, mouse, display, printer, etc. Note that the peripheral devices may be internal or external to the PC. VxD's can also provide services for the VMM and other VxD's.

Figure 2:
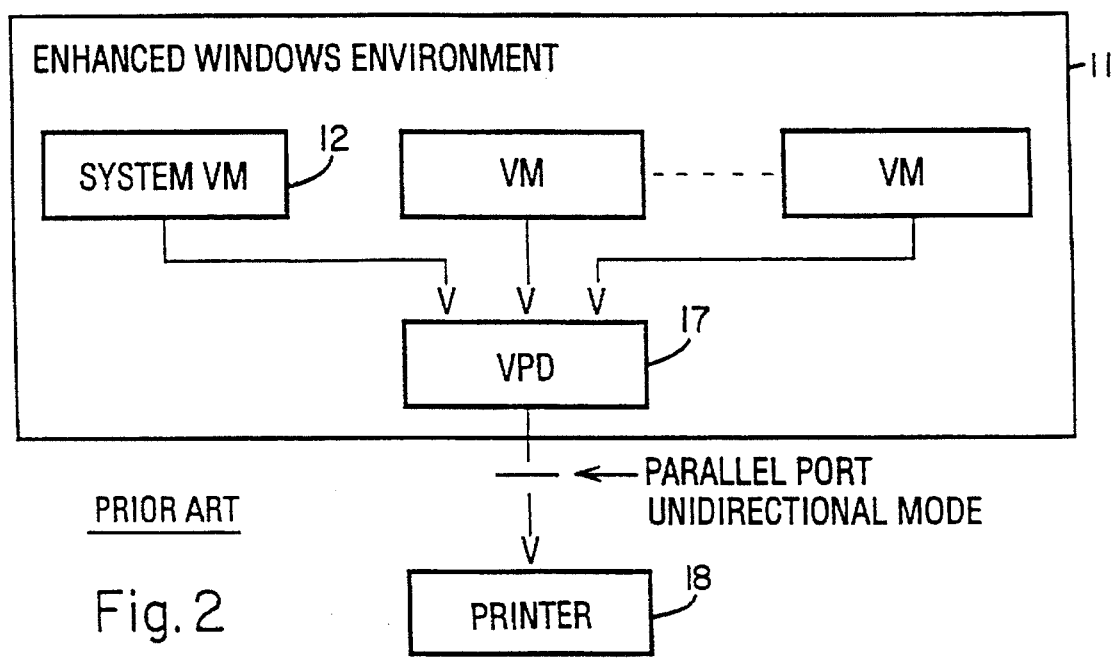
FIG. 2 is a block diagram of the Windows virtual machine print contention.

As shown in FIG. 2, Windows provides a Printer VxD labeled VPD 17, which is called VPD.386. When a Windows user attempts to print on a printer 18 from a VM, the VPD 17 receives a unique identification for that VM. If the user attempts to print from a second VM before the first VM's job has been sent to the printer, the VPD 17 detects the contention. Resolution is handled by notifying the user of the conflict and asking the user to assign ownership of the LPT (parallel) port to the VM of his/her choice.

Figure 3:
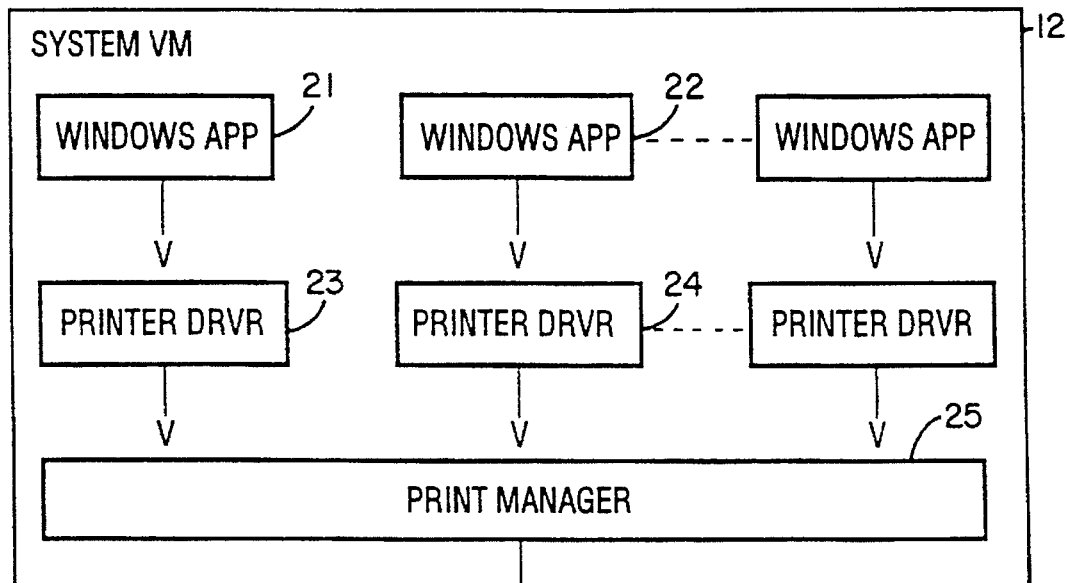
FIG. 3 is a block diagram of the Windows system virtual machine print management.

With reference now to FIG. 3, contention for an LPT (parallel) port can also occur when a user attempts to print from more than one Windows application such as 21 and 22 at a time. Windows handles this by routing Windows application print jobs, which are coupled through printer drivers such as 23 and 24, through Print Manager 25, which will queue and spool print jobs as needed. Windows printing consists of unidirectional data flow from the personal computer to the printer 18 using the Centronics parallel port protocol.

Figure 4:
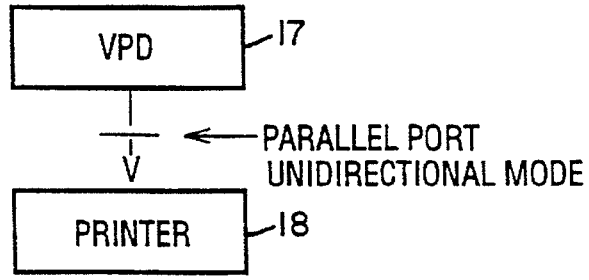
FIG. 4 is a block diagram of a printer control utility to printer communication path.
Figure 4:
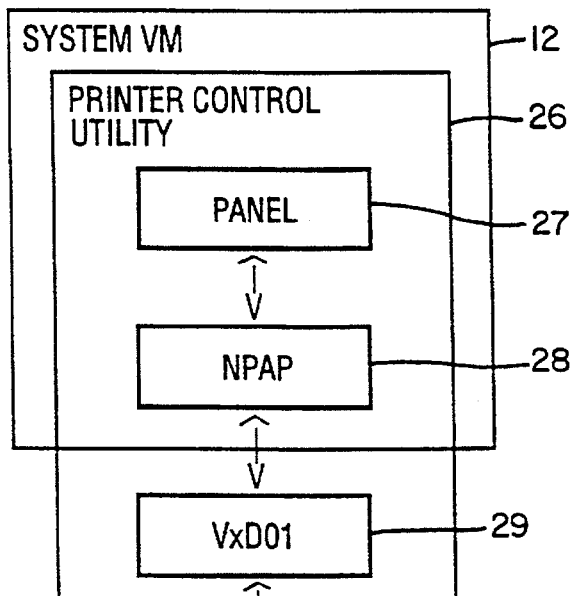

Turning now to FIG. 4, a printer control utility 26 provides bidirectional data flow between the personal computer and a printer 30. The printer 30 is capable of bidirectional communication with the personal computer as well as capable of receiving unidirectionally-communicated print jobs from the personal computer. The IEEE 1284 parallel communications signaling method is the link protocol used. More specifically, byte and nibble modes of the IEEE 1284 standard are used for data flow from the printer 30 to the personal computer. FIG. 4 is a block diagram of the printer control utility 26/printer 30 communication path. Note that most of the printer control utility runs in the System VM 12.

In the printer control utility 26, Panel code 27 provides a user interface that displays a remote printer operator control panel on the personal computer's display. With this interface, the personal computer user can view the contents of the printer's operator panel and push buttons just as if they were viewing and pushing at the real operator panel. The Panel code 27 also displays unsolicited data (alerts) from the printer that are generated by error status and real operator panel changes. The Panel code 27 communicates with the printer via NPAP code 28, a Windows DLL.

The NPAP code processes commands from the Panel code 27. The commands involve data transfer from personal computer to printer and/or from printer to personal computer. The NPAP code 28 also passes alerts from the printer 30 up to the Panel code 27 for display to the user. The NPAP code 28 transforms commands from the Panel code to Network Printer Alliance Protocol (NPAP) format. Link level communication with the printer is via VxD01 29, a Windows VxD.

VxD01 29 processes commands from the NPAP code 28. These commands involve data transfer from/to the printer 30 via the IEEE 1284 link protocol. VxD01 29 also receives alerts from the printer 30 in the form of hardware interrupts and passes the alerts up to the NPAP code 28. In order to allow alerts to occur, VxD01 29 leaves the computer-to-printer interface in 1284 (bidirectional) mode during idle time.

Considering the operation of the printer control utility 26 in more detail, the Panel code 27 permits bidirectional communication with the locally attached printer 30. The Panel code 27 permits a user of the computer to remotely control the printer 30 and also to receive status and fault information from the printer 30. In the present form, the Panel code 27 presents a representation of the printer's operator panel on a display, permitting the user to "push" printer panel buttons and "see" the printer panel display. Panel 27 is the primary Windows application concerned with printer communications that the user actually sees. All user information is displayed and received through this application. Information such as printer status, operator panel displays, and printer configuration is displayed to the user through the Panel application 27. When the user wishes to "press" an operator panel key, the user uses the remote operator panel display on the display for the personal computer, and typically also a mouse input device to point to the "key" and click on it. The Panel application 27 then accepts the button push and uses the other software components of the printer control utility 26 to send the button push down to the printer 30 on the parallel port.

Panel code 27 utilizes the Network Printing Alliance Protocol (NPAP) code 28 in order to communicate bidirectionally with the printer 30. This bidirectional communication can be conducted with printers capable of parsing and sending commands and information in conformance with the NPAP. The NPAP code 28 includes functions which can be called by Panel 27 to take printer commands or requests for printer information from Panel 27 and place them into the NPAP format. The NPAP code 28 also contains functions for receiving printer information in NPAP format, removing the NPAP formatting, and passing the information to Panel code 27.

For the locally attached printer 30, the NPAP code 28 interfaces with a locally attached printer driver VxD01 29, which can handle one or more locally attached printers. In the illustrated case, a local printer is connected physically to a (hardware) standard parallel port of the computer.

VxD01 29 is a Windows Virtual Device Driver which has the task of encapsulating bidirectional communication functionality for the computer's parallel port. The bidirectional functionality is obtained using existing parallel bus hardware and the IEEE Standard 1284 "Standard Signaling Method for Bi-Directional Parallel Peripheral Interface for Personal Computers". The driver 29 is unaware of the content of information relayed between the locally attached printer and the NPAP code 28, and this information can be NPAP commands or other data in NPAP wrappers. The NPAP "wrapping", parsing, etc., is performed in the NPAP code 28 and an NPAP-capable printer such as the printer 30 attached to the personal computer.

Details concerning the use of NPAP commands and extensions thereto is contained in co-pending, commonly assigned, U.S. patent application Ser. No. 08/350,860, filed Dec. 7, 1994, entitled MULTIPLE VIRTUAL PRINTER NETWORK INTERFACE. In that application, the use of bidirectional NPAP communications is described primarily in terms of communications between a host computer and a network attached printer. In the present instance, the same NPAP command structure is used, but the communication is over the standard parallel port of the personal computer utilizing the IEEE 1284 Standard for bidirectional communication. The above-mentioned co-pending application is incorporated herein by reference.

The latest version of the NPAP specification is published and generally available. For example, copies are presently available via anonymous FTP from ftp.lexmark.com [192.146.101.4]. The NPAP Specification Level 1, Revision N, Feb. 11, 1994, is incorporated herein by reference.

Figure 5:
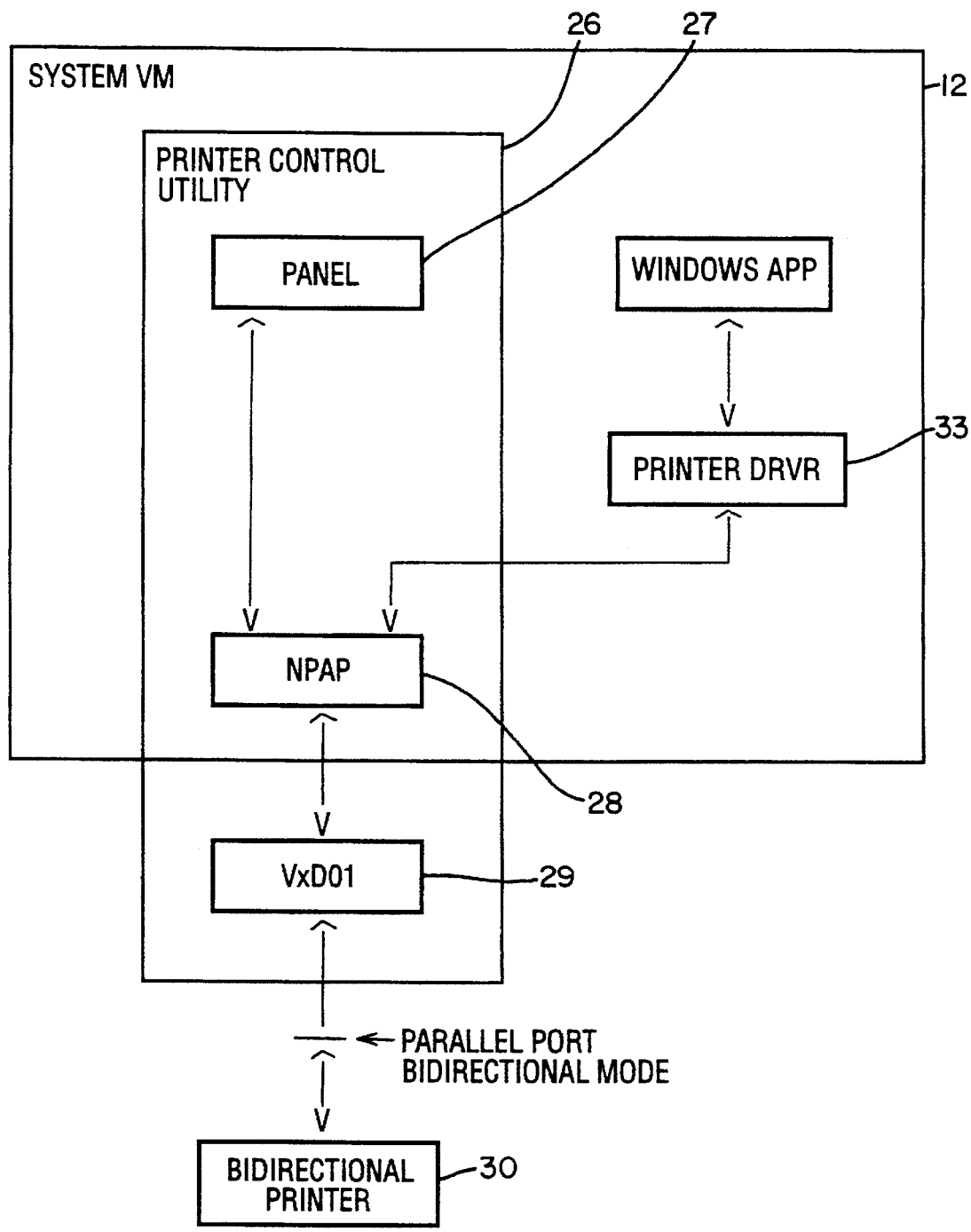
FIG. 5 is a block diagram of the printer control utility local print environment.

As shown in FIG. 5, the printer control utility 26 architecture provides a Windows printer driver 33 (for the printer 30) a printing path to the printer 30 via the NPAP code 28/VxD01 29. Other Windows printer drivers would print to the printer 30 via Windows Print Manager. VM's (DOS sessions) generally print via direct parallel port input/output instructions and BIOS interrupt 17h.

The provision of a printer control utility 26 to take advantage of the bidirectional capabilities of printers such as the printer 30 poses new problems for printing locally. The printer control utility software, while running, must allow the printer 30 to receive print jobs from Windows printer drivers other than the driver 33 and from DOS sessions. Printing from Windows printer drivers other than the driver 33 (hereinafter, other Windows drivers) and from DOS sessions is referred to herein as unidirectional printing. The printer control utility 26 maintains unidirectional printing capability via the NPAP code 28 and the VxD01 29.

There is difficulty in maintaining unidirectional printing due to VxD01 29 using the parallel port in bidirectional mode. In order for the printer control utility 26 to receive unsolicited status messages from the printer 30, the parallel port is left in bidirectional mode during idle time. When the port is in bidirectional mode, standard unidirectional printing can not take place. Therefore, when unidirectional printing is initiated, the parallel port must be taken out of bidirectional mode. Once unidirectional printing has completed, the printer control utility 26 should re-establish bidirectional communication with the printer 30.

Care must also be taken to prevent the mixing of print jobs through the parallel port. If a user is printing via the driver 33 and switches to unidirectional printing in the middle of the driver 33 print job, then VxD01 29 must detect this and prevent the unidirectional printing.

If unidirectional printing is underway and the user attempts to start the printer control utility 26, then VxD01 29 must keep the port in unidirectional mode and allow the unidirectional print job to complete. Once unidirectional printing has completed, the user can direct the printer control utility 26 to establish bidirectional communication with the printer 30.

Figure 6:
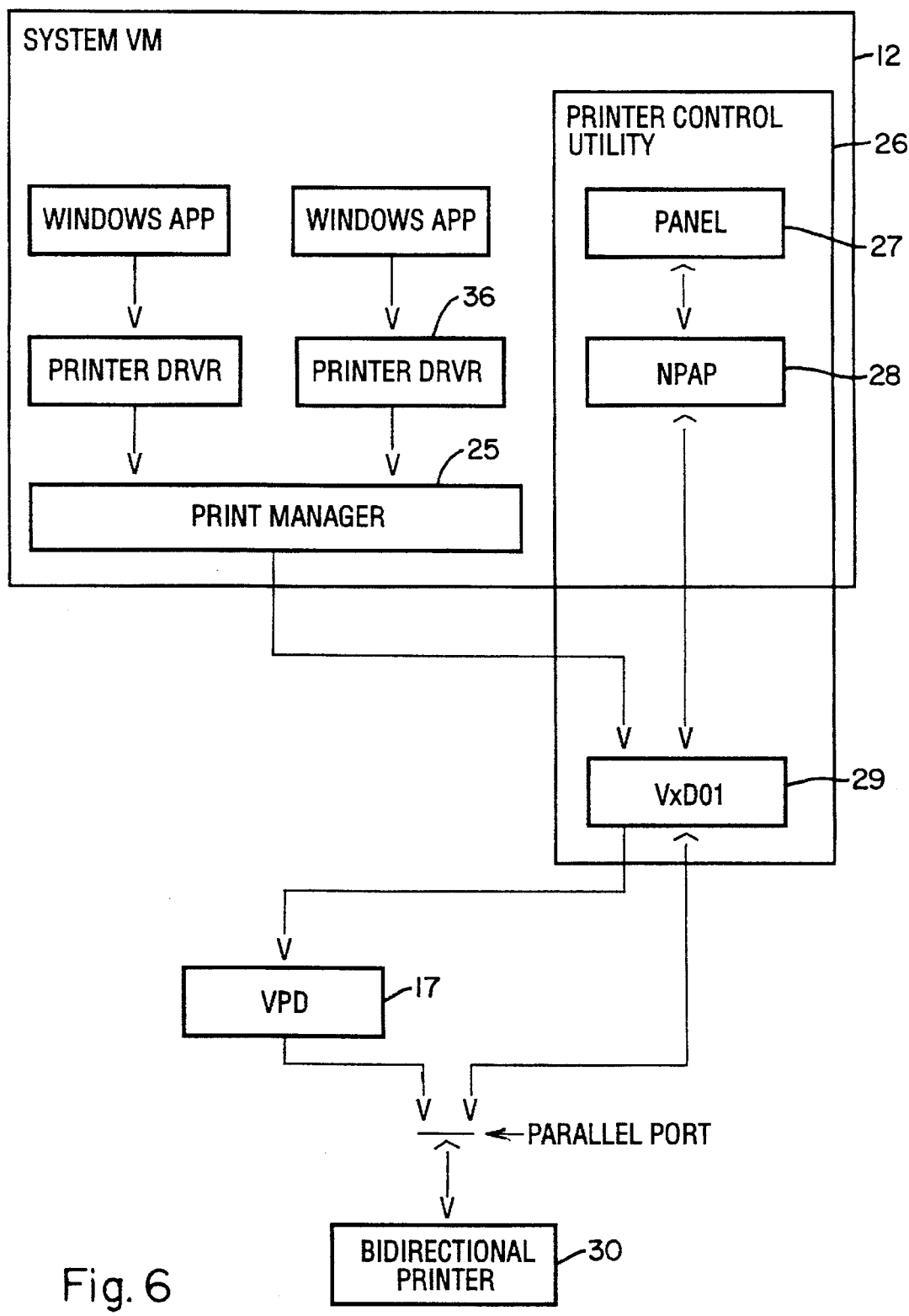
FIG. 6 is a block diagram of the system virtual machine print management with the printer control utility.

To maintain the capability of performing unidirectional printing, the NPAP code 28/VxD01 29 must detect that a unidirectional print job is starting. As shown in FIG. 6, for other Windows drivers such as 36, this is done by having VxD01 29 hook calls to the Windows VPD 17. When another Windows printer driver begins to print, the Windows Print Manager 25 first makes a call to the VPD 17 to acquire ownership of the parallel port. VxD01 29 intercepts this call and, if earlier granted permission by the NPAP code 28, places the port in unidirectional mode. When Print Manager 25 is finished with the print job, it makes a call to VPD 17 to release ownership of the parallel port. VxD01 29 intercepts this call and notifies the NPAP code 28. The NPAP code then calls VxD01 29 to place the parallel port back in bidirectional mode and to update the printer 30 status information.

Figure 7:
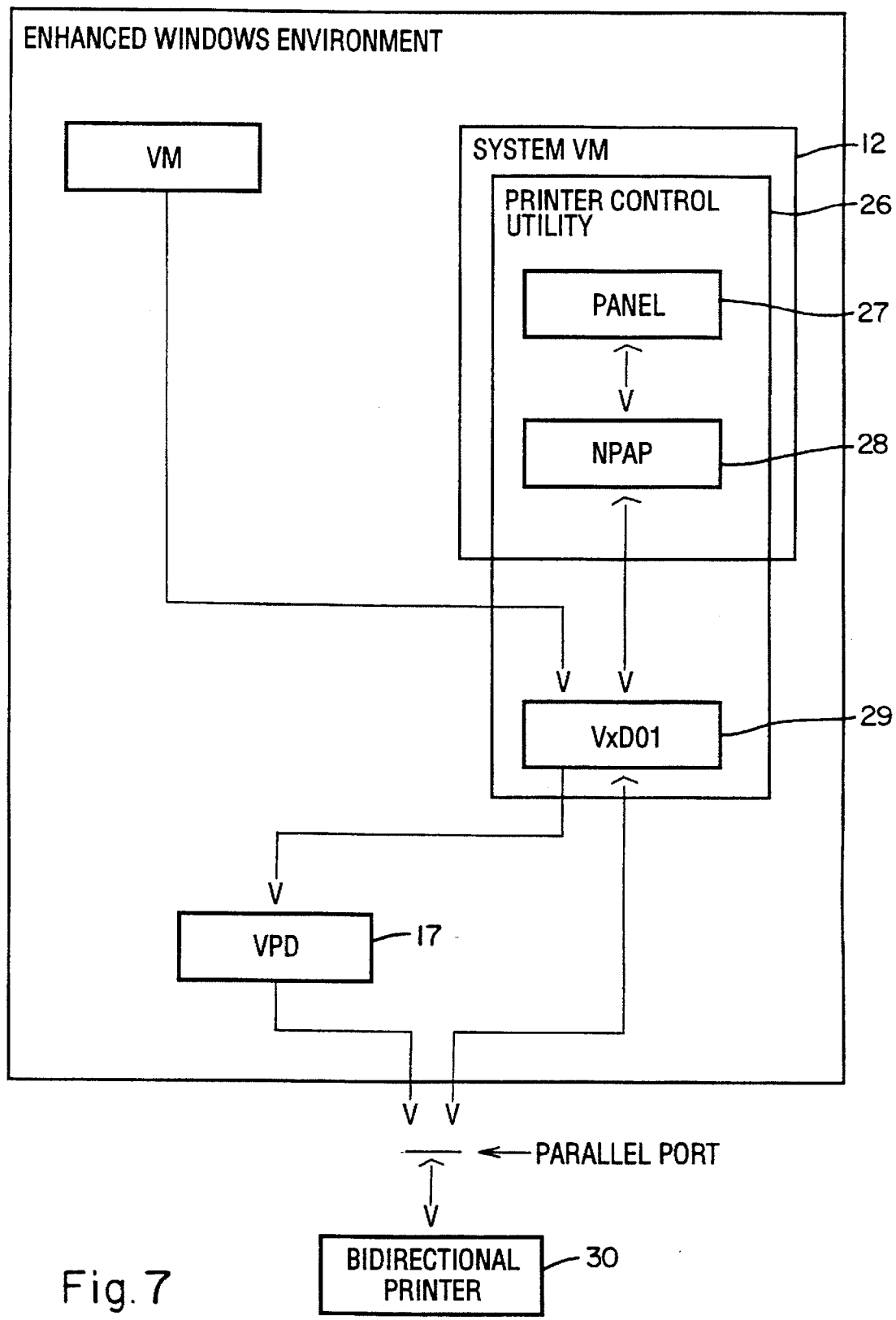
FIG. 7 is a block diagram of the virtual machine print management with the printer control utility.

With reference to FIG. 7, DOS session print jobs are handled by VxD01 29 hooking I/O and BIOS interrupt 17h access to the parallel port. When a DOS session attempts to access the parallel port, a VxD01 IO/Int 17h hook procedure is called by Windows. The VxD01 hook procedure, if earlier granted permission by the NPAP code, places the port in unidirectional mode and processes the DOS parallel port access. When the user switches the device focus away from the DOS session to Windows, VxD01 29 notifies the NPAP code 28. The NPAP code then calls VxD01 29 to place the port back in bidirectional mode and to update the printer 30 status information.

To prevent the mixing of print jobs, the NPAP code 28 doesn't grant unidirectional printing permission to VxD01 if bidirectional printing is occurring. The NPAP code 28 is aware when the Windows printer driver 33 has a print job which is active since the job is routed through the NPAP code 28. VxD01 29 detects the attempted start of unidirectional printing by the methods described above. Upon detecting the attempted start of an other Windows printer driver print job, VxD01 29 returns error status to Print Manager's attempt to acquire ownership of the parallel port. Print Manager 25 will then abort the unidirectional print job. Upon detecting the attempted start of a DOS session print job, VxD01's hook procedure will not allow DOS access to the parallel port. The DOS session print job will not be sent to the printer. For other Windows printer drivers and for DOS session printing cases, the bidirectional print job will not be interrupted.

To avoid starting bidirectional printing when unidirectional printing is underway, VxD01 29 must know if an other Windows printer driver job is active when a user attempts to start the printer control utility 26. VxD01 29 knows this by hooking calls to the Windows VPD 17 as described above. If the other Windows printer driver job is active, VxD01 29 will leave the interface in unidirectional mode and will return appropriate error status to the NPAP code 28 when the printer control utility 26 is started. Once the unidirectional print job is completed, the user can direct the printer control utility 26 to establish bidirectional communication with the printer 30. DOS session printing isn't a concern here because once DOS printing is underway, Windows will suspend DOS printing if the user switches the display to Windows.

What is claimed is:

1. A computer and printer system comprising means for communicating print job data over a communication interface from the computer to the printer when the interface is in unidirectional mode and for communicating print job data and other information between the computer and the printer when the interface is in bidirectional mode, interface control means for usually maintaining the interface in bidirectional mode and for selectively placing the interface in unidirectional mode, and means for producing a unidirectional access request for access to the interface to communicate data from the computer to the printer in unidirectional mode, the interface control means including means, responsive to a unidirectional access request, for placing the interface in unidirectional mode if communication is not then occurring between the computer and printer over the interface in bidirectional mode.

2. The system of claim 1 in which the computer is operating in a single-threaded multi-application environment and in which the interface control means includes means for intercepting unidirectional access requests from other applications operating in the multi-application environment.

3. The system of claim 1 in which the computer is operating in a single-threaded multi-application environment and in which the interface control means includes means for intercepting unidirectional access requests by applications operating outside the multi-application environment.

4. A computer and printer system, said computer system including a graphical interface operating system for graphically displaying indicia of applications, functions, and actions operable by a user, a printer control utility operable in association with said operating system and comprising means for communicating print job data over a communication interface from the computer to the printer when the interface is in unidirectional mode and for communicating print job data and other information between the computer and the printer when the interface is in bidirectional mode, said printer control utility including interface control means for normally maintaining the interface in a bidirectional mode and for selectively placing the interface in a unidirectional mode, and means for producing a unidirectional access request for access to the interface to communicate data from the computer to the printer in unidirectional mode, the interface control means including means, responsive to a unidirectional access request, for placing the interface in unidirectional mode only if communication is not then occurring between the computer and printer over the interface in bidirectional mode.

\* \* \* \* \*